United States Patent
Bayer et al.

(10) Patent No.: US 6,564,667 B2
(45) Date of Patent: May 20, 2003

(54) DEVICE FOR COMPENSATING THE WEIGHT OF A ROBOT ARM

(75) Inventors: Albert Bayer, Augsburg (DE); Wolfgang Bohlken, Friedberg (DE); Alwin Berninger, Augsburg (DE)

(73) Assignee: Kuka Roboter GmbH (DE)

( * ) Notice: Subject to any disclaimer, the term of this patent is extended or adjusted under 35 U.S.C. 154(b) by 92 days.

(21) Appl. No.: 09/775,779

(22) Filed: Feb. 2, 2001

(65) Prior Publication Data

US 2001/0022112 A1 Sep. 20, 2001

(30) Foreign Application Priority Data

Feb. 17, 2000  (DE) .......................................... 100 07 251

(51) Int. Cl.[7] .............................. B25J 18/00; F16F 3/00
(52) U.S. Cl. ...................... 74/490.01; 267/291; 901/48
(58) Field of Search ..................... 74/490.01; 414/720; 901/48; 267/289, 290, 291, 70, 71; 16/401; 254/10.5

(56) References Cited

U.S. PATENT DOCUMENTS

| | | | | |
|---|---|---|---|---|
| 962,703 A | * | 6/1910 | Eckhard | 267/290 |
| 1,007,120 A | * | 10/1911 | Leech | 267/290 |
| 1,329,561 A | * | 2/1920 | Thompson | 267/290 |
| 1,811,403 A | * | 6/1931 | Mesinger | 267/290 |
| 1,825,093 A | * | 9/1931 | Sansburn | 267/290 |
| 2,123,388 A | * | 7/1938 | Viguerie, Jr. | 267/290 |
| 3,399,879 A | * | 9/1968 | Hojo | 267/291 |
| 3,944,196 A | * | 3/1976 | Schwartzkopf | 267/168 |
| 4,118,020 A | * | 10/1978 | Myers | 267/291 |

FOREIGN PATENT DOCUMENTS

| | | |
|---|---|---|
| DE | 198 01 229 C1 | 12/1998 |
| EP | 0 947 296 A2 | 10/1999 |
| JP | 57-15135 | * 1/1982 |
| JP | 2-279295 | * 11/1990 |
| JP | 03055192 | 3/1991 |

* cited by examiner

Primary Examiner—William C. Joyce
(74) Attorney, Agent, or Firm—McGlew and Tuttle, P.C.

(57) ABSTRACT

A device for compensating the weight of a robot arm of a robot with a spring cylinder and having at least one helical spring is characterized in that there is at least one mechanism for the insertion and removal of at least one further, replaceable helical spring and preferably a pretension of at least the replaceable helical spring is adjustable. The device according to the invention makes it possible to modify the spring constant of the spring cylinder in order to individually adjust the compensating force desired for compensating the weight of the robot.

21 Claims, 3 Drawing Sheets

DEVICE FOR COMPENSATING THE WEIGHT OF A ROBOT ARM

FIELD OF THE INVENTION

The invention relates to a device for compensating the weight of a robot arm of a robot with a spring cylinder or housing having at least one helical spring, as well as a robot equipped with such a device.

BACKGROUND OF THE INVENTION

For the compensation of static loads a robot generally has at least one weight compensating device, which is e.g. constructed as a spring cylinder or fluid spring, particularly a gas spring. In the case of multiaxial industrial robots, which have a carrousel pivotable about a base axis (A1-axis) located on a frame and a robot arm pivotable about several axes and located on a rocker arm on the carrousel, such devices are more particularly provided between the rocker arm and the carrousel in order to absorb the load moments of the A2-axis. They are e.g. fixed in such a way to the rocker arm or robot arm, that they are compressed or extended on deflecting the rocker arm or robot arm and consequently transform the pressure dependent on robot arm deflection into a force dependent on said deflection for compensating the gravity or the torque caused by it exerted on the rocker arm or robot arm.

When using gas springs it is disadvantageous that the relationship between the deflection and force of the gas spring is only proportional for as long as the behaviour of the gas approximately corresponds to the ideal gas equation. Since in particular at higher gas pressures, the gas no longer behaves in an ideal manner and is heated on compression and cools on depression and conversely the gas pressure also changes with temperature fluctuations, the force produced by gas springs has a considerable fluctuation range, which leads to a fluctuating load compensation due to temperature changes, which must be compensated by regulating and control processes. Leaks in the gas springs also lead to a failure of the weight compensation, so that monitoring devices respond, followed by the disconnection of the robot and plant shutdown, which can result in robot overload and damage.

The disadvantage of spring cylinders or housings is in particular that they have a substantially invariable spring constant and can consequently not be used in flexible manner. If different demands are made on the compensating force of a robot weight compensation, either when changing to a different carrying capacity or when changing the motion ratios of the robot, the spring cylinder must be replaced, which is complicated and costly and makes it necessary to stock several spring cylinders with different spring constants. Therefore the problem of the invention is to so further develop a device for compensating the weight of a robot arm of a robot with a spring cylinder having at least one helical spring in such a way that it can be adapted to the compensation forces necessary for the motion ratios and load states of the robot and can consequently also be flexibly used with varying load ratios and different robots.

SUMMARY OF THE INVENTION

According to the invention this problem is solved in the case of a device of the aforementioned type by at least one mechanism for the easy insertion and removal of at least one further, replaceable helical spring of the spring cylinder.

As a result of the construction according to the invention the weight compensating device is universally usable, in that as a function of the necessary compensating force of the weight compensation the replaceable helical spring is removed or helical springs with different spring constants are inserted in the spring cylinder. In place of the entire spring cylinder it is only necessary to insert, remove or replace the interchangeable helical springs. In particular there is no need to dismantle the spring cylinder from the robot and instead the robot arm having the weight compensation is e.g. secured and the helical spring is replaced on the fitted spring cylinder. The weight compensating device according to the invention is consequently suitable for different robots with different motion ratios and load states and makes it unnecessary to store spring cylinders with different spring constants.

What is important is the usability and replaceability of the additional helical springs without dismantling or disconnection of the spring cylinder from the robot. Thus, in its working cell or location a robot can be easily converted to other carrying capacities, which leads to a considerable time saving compared with existing possibilities.

Whilst the spring cylinder can fundamentally have a fixed installed helical spring, in a preferred construction it has two of these and also a replaceable helical spring, so that both the fixed installed helical springs and also the replaceable helical spring contribute to the overall spring constant of the weight compensation. If the fixed installed and replaceable helical springs are arranged in parallel, the total spring constant of the spring cylinder is the sum of the spring constants of the fixed installed and replaceable helical springs. It is obviously possible to provide more than two fixed installed helical springs and more than one replaceable helical spring, which are connected in parallel for obtaining a high spring constant.

For compactness reasons the helical springs are preferably arranged substantially concentrically, the replaceable helical spring preferably being positioned centrally. To permit easily insertion and removal of the replaceable helical spring, in this case it is preferable to place on an end face of the spring cylinder facing a bottom forming an abutment for the helical springs, a lid with a central bore or hole for the replacement of the replaceable helical spring. The hole preferably has a cover, through which in particular a contact protection is provided, but which can also form a substantially dust-tight and moisture-tight closure.

In another preferred construction, an inner disk forming an abutment for the replaceable helical spring and connected to a piston rod of the spring cylinder as provided and which is detachably connected to an outer disk forming an abutment for the fixed installed helical springs. In particular, the external diameter of the outer disk is larger and the external diameter of the inner disk smaller than the diameter of the central hole in the spring cylinder lid. Thus, for replacing the replaceable helical spring the inner disk can be detached from the outer disk and removed together with the replaceable helical spring through the hole in the spring cylinder lid, whilst the outer disk, as a result of its diameter exceeding the hole diameter, retains in the spring cylinder the fixed installed helical springs.

According to a preferred construction, a pretensioning of at least the replaceable helical spring is adjustable, so as to vary the desired total spring constant of the spring cylinder. For this purpose is provided a spindle on the spring cylinder piston rod for adjusting the replaceable helical spring length corresponding to the desired pretension and on which is axially displaceably fixed in particular an abutment for the inner disk forming the replaceable helical spring, e.g. by means of a nut.

Preference is also given to an adjustability of a pretension of at least one further, fixed installed helical spring, the length of the fixed installed helical spring corresponding to the desired pretension being e.g. adjustable together with the length of the replaceable helical spring corresponding to the desired pretension using the spindle, which can in particular be ensured by the detachable connection between the inner and outer disks.

In order to ensure an easy and reliable replacement of a replaceable helical spring to be inserted in the spring cylinder and having a length exceeding that corresponding to the desired pretension, according to a preferred construction a mounting spindle placeable on the piston rod of the spring cylinder is provided for compressing such a replaceable helical spring during insertion in the spring cylinder. Preferably the mounting spindle can be placed on the end face of the spindle remote from the spring cylinder in a coaxial and aligned manner, so that in particular on fitting a replaceable helical spring the inner disk is placed and fixed by means of the mounting spindle on the spring cylinder spindle.

In order to ensure a completely satisfactory operation of the device according to the invention, preferably centering devices are provided for the concentric arrangement of the helical springs in the spring cylinder and on the one hand there is a centering cylinder at least concentrically guiding the replaceable helical spring with respect to an adjacent, fixed installed helical spring and preventing a contact between the replaceable helical spring and the adjacent, fixed installed helical spring, and on the other a centering ring concentrically guiding at least an inner with respect to an outer, fixed installed helical spring. The inner disk preferably also has a centering shoulder engaging in the replaceable helical spring and, if there are at least two fixed installed helical springs, the outer dial has a centering collar concentrically guiding an inner with respect to an outer, fixed installed helical spring.

The invention also relates to a robot, particularly a multiaxial industrial robot, which is equipped with such a weight compensating device.

BRIEF DESCRIPTION OF THE DRAWINGS

The invention is described in greater detail hereinafter relative to a preferred embodiment and with reference to the attached drawings, wherein show.

DETAILED DESCRIPTION OF THE DRAWINGS

Figure 1:
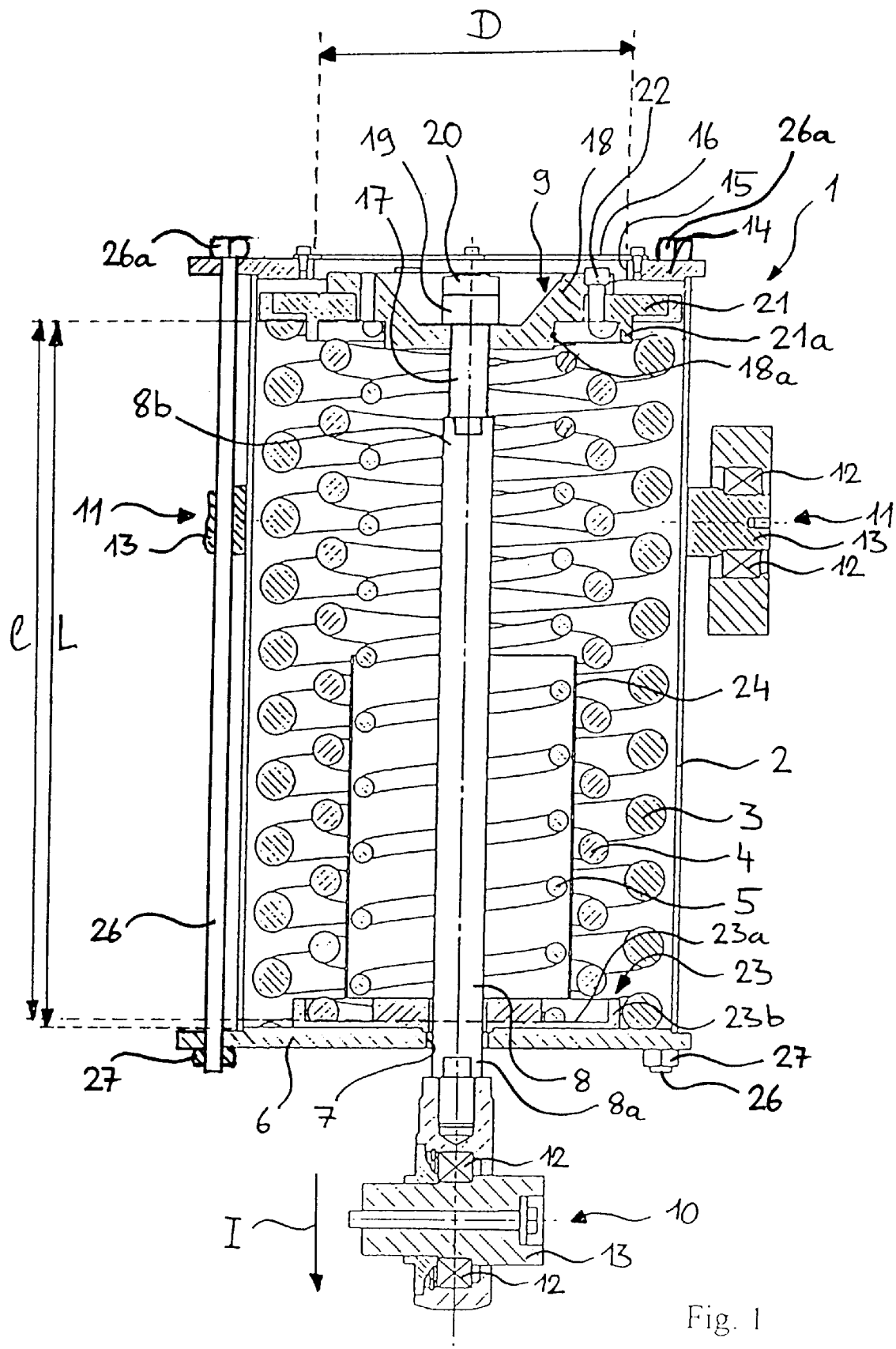
FIG. 1 A longitudinal section I—I according to FIG. 3 through a spring cylinder of an embodiment of a device according to the invention.

FIG. 1 shows a device according to the invention for compensating the weight of a robot arm, which has a spring cylinder or housing 1 with helical springs 3, 4, 5 concentrically arranged in a casing 2 and whereby said springs can e.g. have different spring constants. As a result of the parallel arrangement of the helical springs 3, 4, 5, the total spring constant of the spring cylinder 1 corresponds to the sum of their spring constants. Whilst the helical springs 3, 4 are fixed installed helical springs, the central helical spring 5 is replaceable. Abutments for the helical springs 3, 4, 5 are on the one hand constituted by a bottom 6 of the casing 2 of the spring cylinder 1 and on the other a disk 9 connected to a piston rod 8 traversing a central hole or bore 7 in the bottom 6 of the casing 1. In this way on extracting the piston rod 8 out of the casing 2 in the direction of the arrow I, the helical springs 3, 4, 5 are compressed and when the piston rod 8 is moved in the opposite direction they are relaxed or untensioned. The force necessary for extraction is proportional to the extraction path and the proportionality factor corresponds to the total spring constant of the spring cylinder 1.

In order to fix the spring cylinder 1 on parts of a robot movable relative to one another, e.g. between a robot arm and a not shown carrousel, on the end 8a of the piston rod 8 remote from the spring cylinder 1 is provided a fastening device 10 and on the casing 2 of the spring cylinder 1 a fastening device 11, which in the construction shown in each case have a bearing block 13 mounted by means of roller bearings 12 and whereof in the drawing the left-hand fastening device 11 is shown in broken away form.

The end face of the spring cylinder 1 opposite to the bottom 6 is closed by a lid 14, which has a central hole or bore 15 to ensure easy replacement of the helical spring 5. The hole 15 is dosed in dust-tight and moisture-tight manner by a cover 16. The bottom 6 and lid 14 are held in a fixed relative position by means of locking springs 26 passing through the same and positioned externally of the casing 2. A head 26a and a nut 27 of each locking screw 26 brace the lid 14 of the spring cylinder 1 against the bottom 6.

To the end 8b of the piston rod 8 located within the spring cylinder 1 is connected a spindle 17, to which is secured by means of a nut 19 an inner disk 18 of the disk 9 serving as an abutment for the replaceable helical spring 5. The nut is secured by a locknut 20. Through the axial displacement of the inner disk 18 along the spindle 17, it is possible to adjust the length L of the replaceable helical spring 5 corresponding to the desired pretension. By means of screws 22 an outer disk 21 serving as an abutment for the fixed installed helical springs 3, 4 is detachably connected to the inner disk 18. Whilst the external diameter of the outer disk 21 exceeds the diameter D of the hole 15 in the lid 14 of the spring cylinder 1, the external diameter of the inner disk 18 is smaller than the diameter D of the hole 15, so that the inner disk 18 can be removed from the spring cylinder 1 through the hole 15. Through the detachable connection between the outer disk 21 and the inner disk 18, on the one hand an easy removal of the replaceable helical spring 5 through the central hole 15 in the lid 14 of the casing 2 is possible and on the other in this way the length L of the fixed installed helical springs 3, 4 corresponding to the desired pretension, together with the length l of the replaceable helical spring 5 corresponding to the desired pretension can be adjusted by means of the spindle 17.

For the concentrical arrangement of the helical springs 3, 4,5 centering devices are provided which, in the construction shown, comprise a centering ring 23 with an annular groove 23a receiving the replaceable helical spring 5 and the fixed installed, inner helical spring 4 and a circumferential collar 23b separating the fixed installed, inner helical spring 4 from the fixed installed, outer helical spring 3. There are also a centering shoulder 18a engaging in the replaceable helical spring 5 and formed on the inner disk 18, a centering collar 21a separating the fixed installed, inner 4 from the outer helical spring 3 and formed on the outer disk 21 and a centering cylinder concentrically guiding the replaceable helical spring 5 within the fixed installed, inner helical spring 4.

Figure 2:
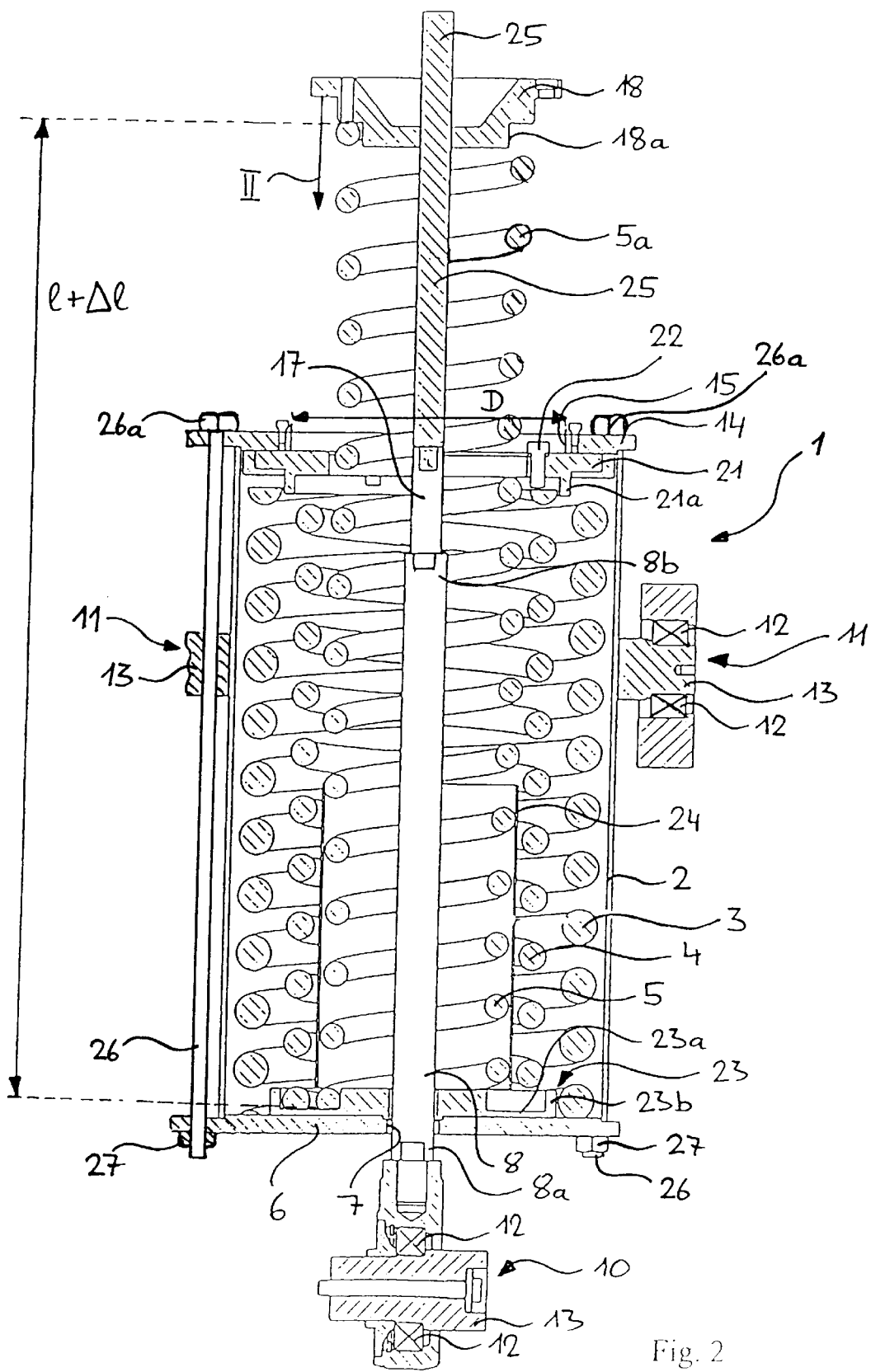
FIG. 2 A longitudinal section through the spring cylinder according to FIG. 1 during the insertion of the replaceable helical spring.

For removing the replaceable helical spring 5 the parts of the not shown robot, on which the spring cylinder 1 is fixed, are secured against one another and the cover 16 is removed from the hole 15 of casing 2. The locknut 20 and nut 19 are then released from the spindle 17, so that if at least one of the helical springs 3, 4, 5 is under a pretension, the outer disk 21 of the disk 9 forming the abutment for the helical springs, 3, 4, 5 engages on the inside of the lid 14 (FIG. 2). Subsequently the inner disk 18 of disk 9 is removed from the outer disk 21 by loosening the screws 22, the mounting spindle 25 is applied to the spring 17 and the helical spring 5 is untensioned by means of the spindle 17, so that it can finally be removed through the hole 15 in lid 14 of casing 2.

If it is intended only to use the spring cylinder 1 equipped with the two fixed installed helical springs 3, 4, the inner disk 18 is again screwed to the outer disk 21 and by moving the disk 9 along the spindle 17 by means of the nut 19 the desired pretension of the helical springs 3, 4 is set (FIG. 1). Then the nut 19 is secured with the locknut 20 and the hole 15 in lid 14 is closed by means of the cover 16.

If the helical spring 5 removed from the spring cylinder 1 is to be replaced by another helical spring 5a with a different spring constant and the helical spring 5a to be introduced is in particular a spring which, in the unloaded state, has a length l+Δl exceeding the length l (FIG. 1) corresponding to the desired pretension, then a mounting spindle 25 (FIG. 2) is provided, which is coaxially and in aligned manner placed, e.g. screwed to the end face of the spindle 17. After inserting the helical spring 5a in the casing 2 of the spring cylinder 1, the inner disk 18 is placed on the mounting spindle 25 and e.g. by means of a not shown wing nut and accompanied by the compression of the spring 5a is moved along the mounting spindle 25 in the direction of arrow II until the inner disk 18 can be fixed by means of the screws 22 on the outer disk 21 engaging on the inside of the lid 14. Then the mounting spindle 25 is removed, the inner disk 18 with the outer disk 21 is secured under the desired pretension of all the springs 3, 4, 5a by means of nut 19 on spindle 17 (FIG. 1) and the nut 19 is secured in the desired position by the locknut 20. The hole 15 in lid 14 of casing 2 is then closed by means of the cover 16. The total spring constant of the spring cylinder 1 is now the sum of the spring constants of all the helical springs 3, 4, 5a.

Figure 3:
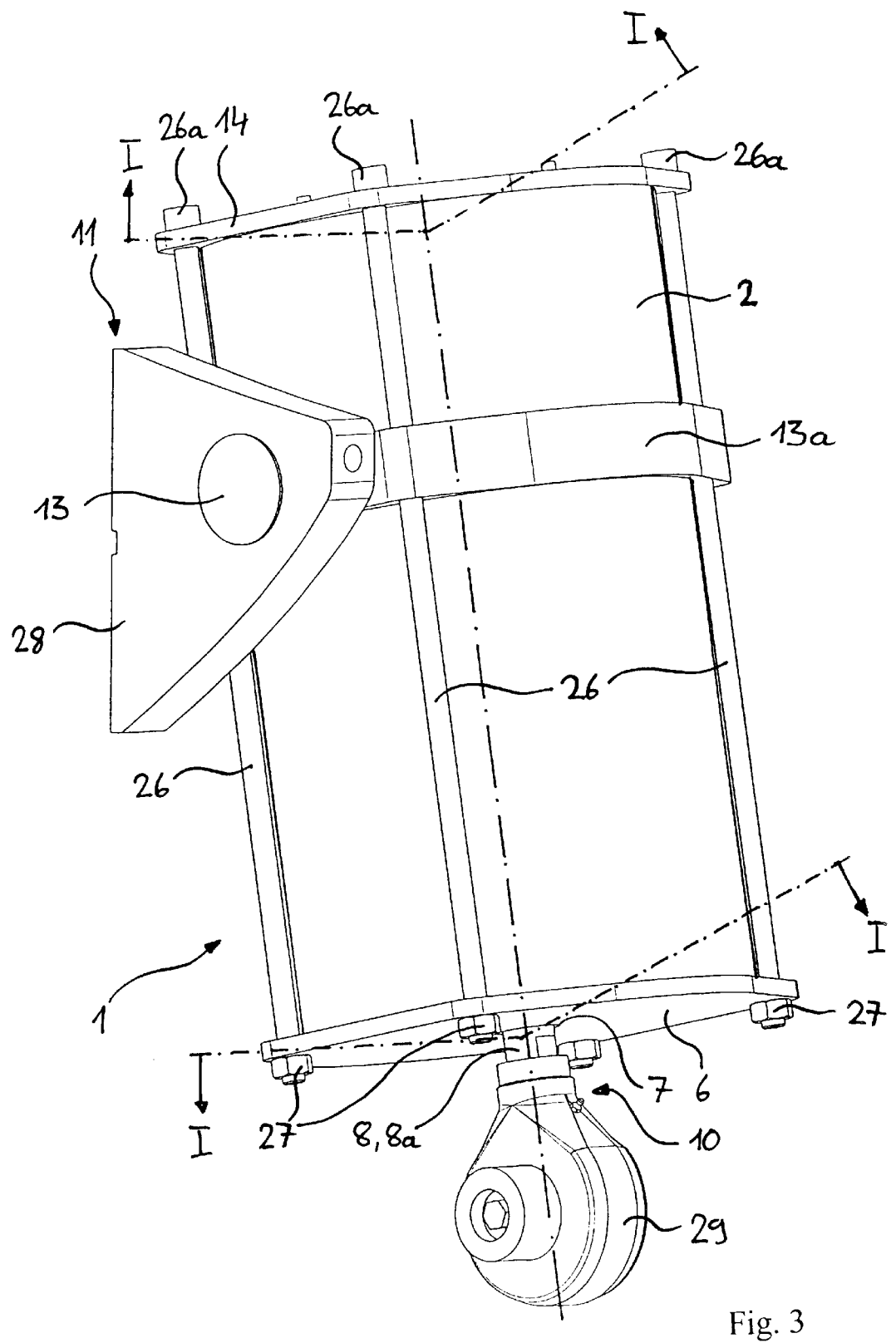
FIG. 3 A perspective view of the spring cylinder of FIG. 1.

As can be gathered from FIG. 3, the bottom 6 of the spring cylinder 1 is braced against the lid 14 by means of four locking screws 26 located on the outside of the casing 2. A retaining ring 13a secured on the circumference of the casing 2 serves to receive the bearing blocks 13 of the fastening devices 11 and in each case a holding device 28 for fastening the spring cylinder 1 to part of a robot, e.g. to a carrousel. For securing the spring cylinder 1 on a robot part, e.g. a robot arm movable relative to said robot part, a further holding device 29 is located on the fastening device 10 arranged on the piston rod 8 traversing the bottom 6 of the casing 2.

LIST OF REFERENCE NUMERALS

| | |
|---|---|
| 1 | Spring cylinder |
| 2 | Casing |
| 3/4 | Fixed installed helical spring |
| 5, 5a | Replaceable helical spring |
| 6 | Casing bottom |
| 7 | Hole |
| 8 | Piston rod |

-continued

LIST OF REFERENCE NUMERALS

| | |
|---|---|
| 8a | Piston rod end remote from the spring cylinder |
| 8b | Piston rod end facing the spring cylinder |
| 9 | Disk |
| 10/11 | Fastening device |
| 12 | Roller bearing |
| 13 | Bearing block |
| 13a | Retaining ring |
| 14 | Casing lid |
| 15 | Central hole |
| 16 | Cover |
| 17 | Spindle |
| 18 | Inner disk |
| 18a | Centring shoulder |
| 19 | Nut |
| 20 | Locknut |
| 21 | Outer disk |
| 21a | Centring collar |
| 22 | Screw |
| 23 | Centring ring |
| 23a | Circular groove |
| 23b | Collar |
| 24 | Centring cylinder |
| 25 | Mounting spindle |
| 26 | Locking screw |
| 26a | Locking screw head |
| 27 | Nut |
| 28/29 | Holding device |
| I/II | Directional arrow |
| l | Preloaded, replaceable helical spring length |
| l+Δl | Relaxed, replaceable helical spring length |
| L | Fixed installed helical spring length |
| D | Central hole diameter |

What is claimed is:

1. A robot compensating device for compensating the weight of a robot arm, the device comprising;

a spring cylinder with at least one helical spring; and means for the insertion and removal of at least one replaceable further helical spring of the spring cylinder without dismantling the spring cylinder from the robot, the means including an inner disk forming an abutment for the replaceable further helical springy said inner disk being connected to a piston rod of the spring cylinder and said inner disk being detachably connected to an outer disk fanning an abutment for said helical spring.

2. A device according to claim 1, wherein two fixed installed helical springs are provided with one replaceable further helical spring.

3. A device according to claim 1, wherein the helical springs are substantially concentrically positioned and the replaceable further helical spring is centrally positioned.

4. A device according to claim 1, further comprising a lid on an end face of the spring cylinder opposite to a bottom forming another abutment for the helical springs, said lid having a central hole, said central hole being sized such that the replaceable further helical spring can be replaced without removing said lid.

5. A device according to claim 4, further comprising a cover covering the central hole of said lid.

6. A device according to claim 4, wherein an external diameter of said outer disk is larger than a diameter of said central hole in said lid and an external diameter of said inner disk is smaller than said diameter of said central hole in said lid.

7. A device according to claim 1, further comprising a mounting spindle placeable on the piston rod of the spring cylinder for compressing said replaceable further helical spring for inserting replaceable further helical spring in the spring cylinder with a length exceeding the length corresponding to a desired pretension.

8. A device according to claim 7, further comprising a spindle provided on said piston rod of the spring cylinder for adjusting a length of the replaceable further helical spring corresponding to the desired pretension wherein said mounting spindle can be placed coaxially and in an aligned manner on an end face of said spindle.

9. A device according claim 1, wherein a pretension of at least the replaceable further helical spring is adjustable.

10. A device according to claim 9, further comprising a spindle provided on said piston rod of the spring cylinder for adjusting a length of the replaceable further helical spring corresponding to the desired pretension.

11. A device according to claim 10, wherein the inner disk forming an abutment for the replaceable helical spring is displaceably secured on said spindle.

12. A device according to claim 9, wherein a pretension of a least one fixed and installed further helical spring is adjustable.

13. A device according to claim 12, wherein a length of the fixed and installed helical springs corresponding to a desired pretension can be adjusted together with a length of the replaceable helical spring corresponding to a desired pretension using a spindle.

14. A device according to claim 1, comprising a centering device for a concentrical arrangement of the helical springs in the spring cylinder.

15. A device according to claim 14, wherein said centering device includes a centering cylinder for concentrically guiding at least the replaceable helical spring with respect to an adjacent fixed installed helical spring.

16. A device according to claim 14, wherein said centering device includes a centering ring for concentrically guiding at least an inner fixed installed helical spring with respect to an outer fixed installed helical spring.

17. A device according to claim 14, wherein said centering device includes said inner disk with a centering shoulder engaging in the replaceable helical spring.

18. A devise according to claim 14, wherein said centering device includes said outer disk with a centering collar concentrically guiding an inner fixed installed helical spring with respect to an outer fixed installed helical spring.

19. A robot comprising:
a robot part; and
a device connected to said robot part for compensating the weight of a robot arm of the robot, the device including a spring cylinder with a piston rod and a bottom forming a spring abutment, a fixed helical spring in said spring cylinder and engaging said spring abutment, a replaceable further helical spring in said spring cylinder and engaging said spring abutment, an outer disk forming another abutment for said fixed helical spring and an inner disk forming a replaceable spring abutment engaging said replaceable further helical spring, said inner disk being connected to said piston rod and said inner disk being detachably connected to said outer disk whereby said replaceable further helical spring may be inserted and removed without dismantling the spring cylinder from the robot part.

20. A robot according to claim 19, further comprising a lid on an end face of the spring cylinder opposite to a bottom forming another abutment for the helical springs, said lid having a central hole, said central hole being sized such that the replaceable further helical spring can be replaced without removing said lid.

21. A robot according to claim 19, further comprising a spindle provided on said piston rod of the spring cylinder for adjusting a length of the replaceable further helical spring corresponding to the desired pretension.

* * * * *